United States Patent
Ashikhmin et al.

(10) Patent No.: US 8,054,925 B2
(45) Date of Patent: Nov. 8, 2011

(54) METHOD AND APPARATUS FOR SYNCHRONIZING A RECEIVER

(75) Inventors: Alexei Ashikhmin, Morristown, NJ (US); Adriaan J. de Lind van Wijngaarden, New Providence, NJ (US); Thomas L. Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 688 days.

(21) Appl. No.: 12/141,305

(22) Filed: Jun. 18, 2008

(65) Prior Publication Data
US 2009/0034668 A1 Feb. 5, 2009

Related U.S. Application Data

(60) Provisional application No. 60/952,999, filed on Jul. 31, 2007.

(51) Int. Cl.
*H04L 7/00* (2006.01)
*H03L 7/00* (2006.01)
(52) U.S. Cl. .................... 375/354; 327/141
(58) Field of Classification Search ............ 375/354
See application file for complete search history.

(56) References Cited

U.S. PATENT DOCUMENTS
2004/0228270 A1   11/2004   Chen et al.
2007/0086329 A1*  4/2007    Glazko et al. ............. 370/208

FOREIGN PATENT DOCUMENTS
EP    1 206 096 A      5/2002
WO    WO 02/09383 A    1/2002
WO    WO 2007/035810 A 3/2007

OTHER PUBLICATIONS

International Search Report and Written Opinion dated Mar. 13, 2009 in PCT/US2008/009082, Lucent Technologies Inc., Applicant, 13 pages.

* cited by examiner

*Primary Examiner* — David C. Payne
*Assistant Examiner* — Erin File
(74) *Attorney, Agent, or Firm* — Wall & Tong, LLP

(57) ABSTRACT

Various embodiments generally relate to a method for synchronizing a receiver, said method including receiving a stream that includes a cyclic extension, estimating a size of the cyclic extension, extracting an amount of the stream according to the estimated size, and comparing the extracted amount to the stream to determine thereby a portion of the stream likely to include a symbol start point.

24 Claims, 8 Drawing Sheets

METHOD AND APPARATUS FOR SYNCHRONIZING A RECEIVER

CROSS-REFERENCE TO RELATED APPLICATIONS

This application claims benefit of U.S. provisional patent application Ser. No. 60/952,999, filed Jul. 31, 2007, which is herein incorporated by reference.

FIELD OF INVENTION

The invention relates to the field of communications and, more specifically, to a receiver adapted for use in a system that utilizes symbols with a cyclic extension or similar type of repetition of time-domain samples.

BACKGROUND OF INVENTION

Communication systems typically require mechanisms to provide synchronization at the receiver. Such mechanisms are in particular required for orthogonal frequency division multiplexing (OFDM), a communication scheme for transmitting data over N parallel sub-carriers, which is used within the context of Digital Video Broadcasting (DVB) systems, certain wireless local area networks, digital radio systems, power line communications as well as other systems.

An OFDM symbol of length $L=N+G$ consists of N (complex) time-domain samples emerging from an OFDM modulator, as well as a cyclic extension of length G. The cyclic extension is a portion of the N samples taken from the end and/or beginning and positioned preceding and/or following the N samples. The cyclic extension may be utilized as an aid in distinguishing one OFDM symbol from another, as well as function as a guard interval for mitigating inter-symbol interference (ISI) and other undesirable propagation effects.

For an OFDM symbol to render any useful information, an OFDM receiver must be able to distinguish the OFDM symbols. A correlation technique is normally used to determine a starting point of an OFDM symbol. However, in certain communication systems, including DVB-T systems, the precise length of an OFDM symbol is not known to a receiver. Common methods of determining the length of the symbol and estimating its position have been to guess a certain symbol length, perform correlations of the received signal, and to see how the correlation changes over time. If the correlation increases beyond a threshold level, the OFDM symbol is deemed to have been found. While likely to ultimately succeed, this brute force method is time consuming and susceptible to various error sources. Moreover, these random guesses may also not provide a sufficient result in a reasonable amount of time.

SUMMARY OF THE INVENTION

Various embodiments generally relate to a method for synchronizing a receiver detecting symbols with a cyclic extension or similar type of repetition of time-domain samples, including iteratively performing the steps of receiving a stream that includes a sequence of symbols, estimating the size of the symbols, extracting an amount of the stream according to the estimated size of the cyclic extension, and comparing the extracted amount to the stream to determine thereby a portion of the stream likely to include a symbol start point.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Various embodiments will be primarily described within the context of achieving receiver synchronization while detecting an orthogonal frequency division multiplexed (OFDM) signal utilizing a cyclic extension. However, it is fully contemplated that the various embodiments described herein are also equally applicable to detecting similar signal types, including (but not limited to) discrete multi-tone (DMT) modulation, which denotes OFDM-based communications where the transmission is adapted to the channel conditions individually for each sub-carrier. An example of a system that employs this modulation scheme is VDSL.

Figure 1A:
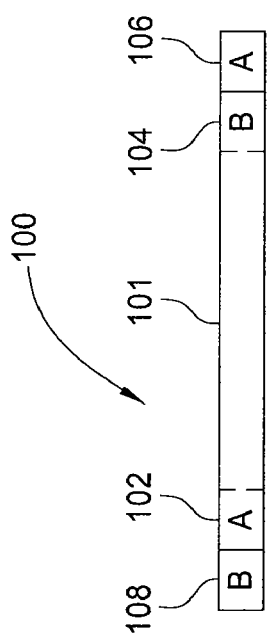
FIG. 1A depicts a diagram of an exemplary symbol configuration as known in the alt.

FIG. 1A depicts an exemplary OFDM symbol configuration 100 known in the art, useful in understanding the various embodiments to be explained. Symbol configuration 100 of length $L=N+G$ includes N (complex) time-domain samples 101 emerging from an OFDM modulator, as well as cyclic prefix portion 108 and cyclic suffix portion 106, which are identical to the portions 104 and 102 of the sample sequence 101. The combined cyclic prefix portion 108 and cyclic suffix portion 106 on each respective side of the sample portion 101 collectively comprise the cyclic extension of length G. The consecutive portions 108 and 102 are identical to the portions 104 and 106. It should be stressed however, that symbol configuration 100 is provided only as an example, and various embodiments to be discussed should not be considered limited to processing only symbols having same exact configuration as symbol configuration 100. Rather, various embodiments are equally envisioned wherein other and further symbol types besides configuration 100, including any symbol having an equivalent general configuration of information-carrying portion and cyclic extension, may be processed according to and without departing from the basic principles thereof.

Figure 1B:
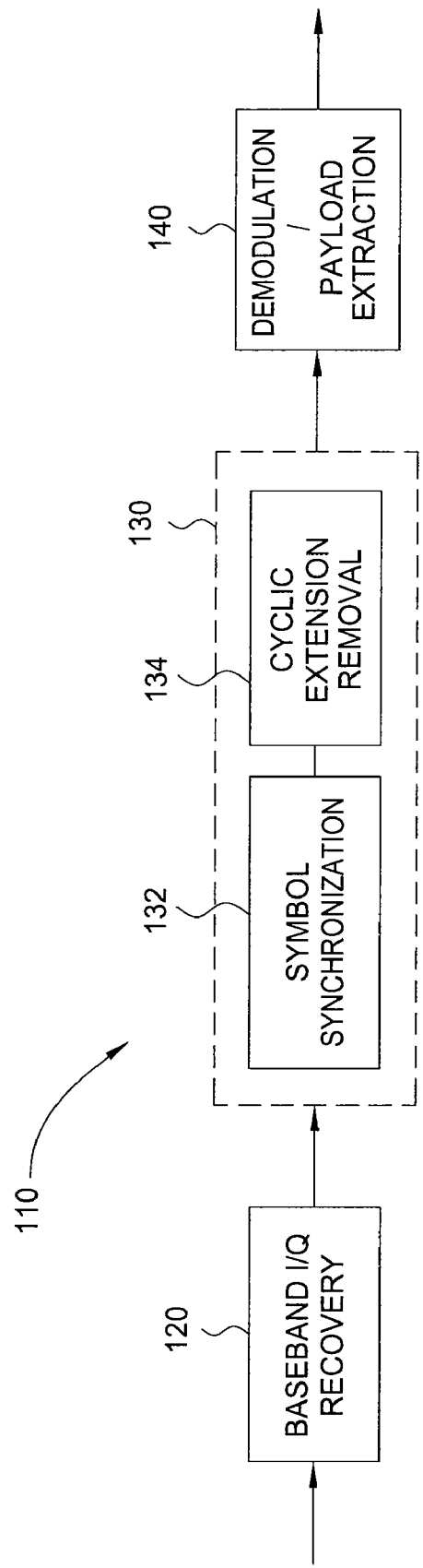
FIG. 1B depicts a block diagram of the front-end of an exemplary architecture of a demodulator that utilizes symbols with a cyclic extension to perform synchronization.

FIG. 1B depicts a block diagram of the front-end of an exemplary receiver 110, suitable for processing signals utilizing a cyclic extension to perform symbol synchronization according to various embodiments, such as an OFDM or DMT signal. Specifically, receiver 110 detects (i.e., receives) an information bearing OFDM signal, and extracts an In-Phase/Quadrature-Phase (I/Q) baseband modulated signal thereon.

Exemplary receiver 110 includes a baseband recovery/conditioning module 120, a synchronization module 130 and a demodulation/payload extraction module 140. Baseband recovery/conditioning module 120 receives the detected signal, and down-converts it into a (complex) I/Q signal. This step may include further operations, such as filtering, interpolation and quantization. The conditioned signal is then processed by synchronization module 130. Various embodiments to be discussed are directed toward processes implementable by a system such as synchronization module 130, but any system performing a similar function may also be utilized without departing from the basic principles disclosed herein.

Synchronization module 130 includes a symbol synchronization module 132 and cyclic extension removal module 134. Symbol synchronization module 132 determines the length and position of the symbol, thereby providing receiver synchronization. Once its length and position have been characterized, the cyclic extension is removed by cyclic extension removal module 134, leaving only the information-carrying part of the symbol, which is extracted by the demodulation/payload extraction module 140. Module 140 typically performs a Fast Fourier Transform (FFT) and may further provide carrier frequency estimation and compensation, as well as post-FFT equalization and payload extraction. Module 140 may also perform sampling frequency offset estimation which may be fed back to the interpolator in module 120.

Generally, the length of a symbol is not known to the receiver at initial acquisition and the length can vary over time. But it may be known (i.e., the receiver may be aware) that the length of the symbols can only take on a limited number of values. It is the task of the symbol synchronization module to automatically detect the length of an OFDM (or other type of) symbol and its relative position. In various embodiments, correlation is utilized to determine the start time of a symbol.

In an exemplary embodiment, an OFDM symbol has a length $L=N+G$, where N is the length of the information-carrying part of the symbol and where G denotes the length of the cyclic extension. At any given time, N may be any one of a set of permissible values $\mathcal{N}$. Correspondingly, G may be any one of a set of possible values $\mathcal{G}^{(N)}$. For example, in a Digital Video Broadcasting—Terrestrial (DVB-T) system, $\mathcal{N}=\{2048, 8192\}$, and the ratio of the cyclic extension relative to the symbol length N is an element of $\{\frac{1}{32}, \frac{1}{16}, \frac{1}{8}, \frac{1}{4}\}$. Thus, for $N=2048$, $\mathcal{G}^{(N)}=\{64, 128, 256, 512\}$, and for $N=8192$, $\mathcal{G}^{(N)}=\{256, 512, 1024, 2048\}$. This implies that the symbol length of in a DVB-T system can be any element of the set $L=\{2112, 2176, 2304, 2560, 8448, 8704, 9216, 10240\}$.

In one embodiment, the sampling rate of an OFDM demodulator is known within a given accuracy. For basic concept introductory purposes, an algorithm is initially described wherein N and G have fixed lengths. Other embodiments to be explained will include those for detection of symbols including any length of N and/or G. In the present example, a stream of (real or complex) samples is represented by $\{y_t\}$, and a quantity of samples $L=N+G$ is sufficient to reconstruct the signal, thus indicating per the current example that no oversampling is assumed. Other embodiments to be described will be applicable to both oversampled and resampled scenarios. In one embodiment, the noise level as well as other propagation effects such as multi-path, are determined, such that if specific detrimental parameters (noise, multi-path, etc.) are relatively low, then fewer samples are needed to determine whether the position of a symbol has been accurately determined.

Of the stream of samples $\{y_t\}$, a first received signal is $y_0$. A buffer of length $L=N+G$ that holds the elements $y_{t-L} \ldots y_{t-1}$ at time t is initialized with zeros, i.e., $y_t=0$ for $-L \leq t \leq 0$. A basic objective of various embodiments is to ascertain a correlation c, between a signal that has been time delayed by N samples and an incoming signal to determine whether the two signal sequence segments (up to length G) are substantially identical. That is, $c_t$ may be expressed as $$c_t = \sum_{g=0}^{G-1} y_{t-g} y_{t-N-g}^*, \quad (1)$$

where $y_{t-N-g}^*$ denotes the complex conjugate of $y_{t-N-g}$. The elements $c_t$ may generally be expressed as $$c_t = c_{t-1} + y_t y_{t-N}^* - y_{t-G} y_{t-N-G}^* \quad (2)$$

The above described correlation may be performed multiple times (e.g., in continuing succession) for multiple symbols. The correlation values accumulating over a period $L=N+G$ are stored as a stacked correlation vector s of length L, wherein the coefficients $s_l^{(r)}$ after r stacked correlations are given as an example by $$s_l^{(r)} = \alpha s_l^{(r-1)} + c_{(r-1)L+l}, \quad (3)$$

wherein $\alpha$ is a weighting factor. If $\alpha=1$, the full value of each correlation value is added (stacked) upon a previous value. In various embodiments to be explained, $\alpha=1$ will provide the best performance under adverse channel conditions, and it will be desirable to maintain $\alpha=1$ for all or most of the time. But, $\alpha$ does not have to remain static over all successive stacking operations. That is, $\alpha$ may be set or adjusted, for example, to cause the influence of older correlations to disappear over time. In one embodiment, at the initialization of every new stacking procedure, all elements of vector $s^{(())}$ are set to zero. But, it is also envisioned that vector s can be (partially) reset or reinitialized by adjusting $\alpha$ to a specific value $0 < \alpha < 1$, to not completely alleviate the influence of all past correlation values.

In one embodiment, an average energy coefficient is determined for the elements of the stacked correlation vector to further aid in the determination of the correct starting position of the symbol. An average energy coefficient $E^{(r)}$ is specified for example as $$E^{(r)} = \frac{1}{L} \sum_{i=0}^{L-1} |s_i^{(r)}|^2. \quad (4)$$

A maximum value of the value $\theta^{(r)}$ of the stacked correlation vector $s^{(r)}$ is also determined over its length L, which may for example be expressed as $$\theta^{(r)} = \underset{0 \leq l < L}{\arg\max} |s_l^{(r)}|, \quad (5)$$

wherein the operator "arg max" denotes the argument or the element index associated with the maximum value.

Utilizing $E^{(r)}$ and $\theta^{(r)}$, the width of a correlation "peak" is determined. When a "peak" exists that has a width greater than zero, it may be referred to as a "plateau." In one embodiment, the "width" of a plateau is determined by an algorithm that first determines two integers $l_1$ and $l_2$ such that $$s_{\theta-q_1 \bmod L}{}^{(r)} \geq \sqrt{E^{(r)}} \quad (6)$$

for all $0 \leq q_1 \leq l_1$ and $$s_{\theta+q_2 \bmod L}{}^{(r)} \geq \sqrt{E^{(r)}} \quad (7)$$

for all $0 \leq q_2 \leq l_2$, wherein "mod" denotes the modulo operator. Subsequently, the energy of a "peak" is determined by $$E_{peak}^{(r)} = \sum_{i=-l_1}^{l_2} |s_{(\theta+i) \bmod L}|^2. \quad (8)$$

Note that in equations (6) and (7), it is not necessary to calculate the square root of $E^{(r)}$ exactly. Depending on the embodiment, an approximation of appropriate order of magnitude or suitable other threshold that produces an acceptable margin of error, will be sufficient in many cases.

In one embodiment, a threshold value $T^{(N,G)}$ for a given N and G is predefined, such that below $T^{(N,G)}$, a value of $E_{peak}^{(r)}$ is considered to not have sufficient energy relative to the rest of the correlation vector to indicate that a cyclic extension location has been established. That is $$\frac{E_{peak}^{(r)}}{E^{(r)}L - E_{peak}^{(r)}} < T^{(N,G)}. \quad (9)$$

The stacking procedure continues until a value of $E_{peak}^{(r)}$ equal to or above $T^{(N,G)}$ is reached, indicating a cyclic extension location has been established, or $$\frac{E_{peak}^{(r)}}{E^{(r)}L - E_{peak}^{(r)}} \geq T^{(N,G)}. \quad (10)$$

In one embodiment, the conditions of inequality (10) being met indicate that the next most likely starting position is at or near $\theta$ (and receiver synchronization can-be/has-been established), assuming $l_1 \approx l_2$. Otherwise, an expected starting position is assumed to be at $\theta+(l_2-l_1)/2$, or near the middle of the region where the correlation values are above $T^{(N,G)}$.

Thus, it follows from equations/inequalities (1) through (10) that a synchronization module such as synchronization module 130 of FIG. 1B may in one embodiment be implemented using a buffer to store L input samples, while a corresponding buffer of size L contemporaneously (e.g., substantially simultaneously) stores stacked correlation values. A sequence of correlation coefficients $c_t$ may be efficiently computed utilizing two multipliers, as for example shown in equation (1). The resulting values of $c_t$ are used to update a stacked correlation value $s_t^{(r)}$, where $l = t \bmod L$ and $r = \lfloor t/L \rfloor$, i.e., r is the highest integer less than or equal to $t/L$. For each new stacking level r, the auxiliary parameters $E^{(r)}$ and $\theta$ with respect to energy can be calculated contemporaneously.

To summarize, an exemplary algorithm represented by equations (1) through (10) stacks a configurable number of correlation vectors to detect the size and location of a cyclic extension. An "observation window" (e.g., an estimated size of N and G) is configured to check all or several possible combinations of symbol lengths in a predefined order. It will be shown later with respect to various embodiments that this can be performed for one particular choice of N and G at a time, or all possible values thereof contemporaneously. The stacking algorithm amplifies a correlation peak and mitigates noise and other undesirable propagation effects by averaging. Once the peak becomes sufficiently distinct, symbol synchronization is achieved. That is the length of the symbol and the position of the cyclic extension are deemed to have been detected and the resulting information may be passed to a cyclic extension removal module for further processing.

By adjusting the number of stacked correlation vectors, various embodiments have been shown to be very robust under adverse channel conditions such as inter-symbol interference (ISI) and multi-path distortion. In a multi-path environment, a receiver detects a signal that is the weighted sum of several delayed copies of each OFDM (or DMT, etc.) symbol, which widens a correlation peak width. In one embodiment, an algorithm measures the width of the correlation peak in order to locate a position for which the corresponding sample is the weighted sum of sample points of a cyclic extension, identifying instances of multi-path.

Figure 2:
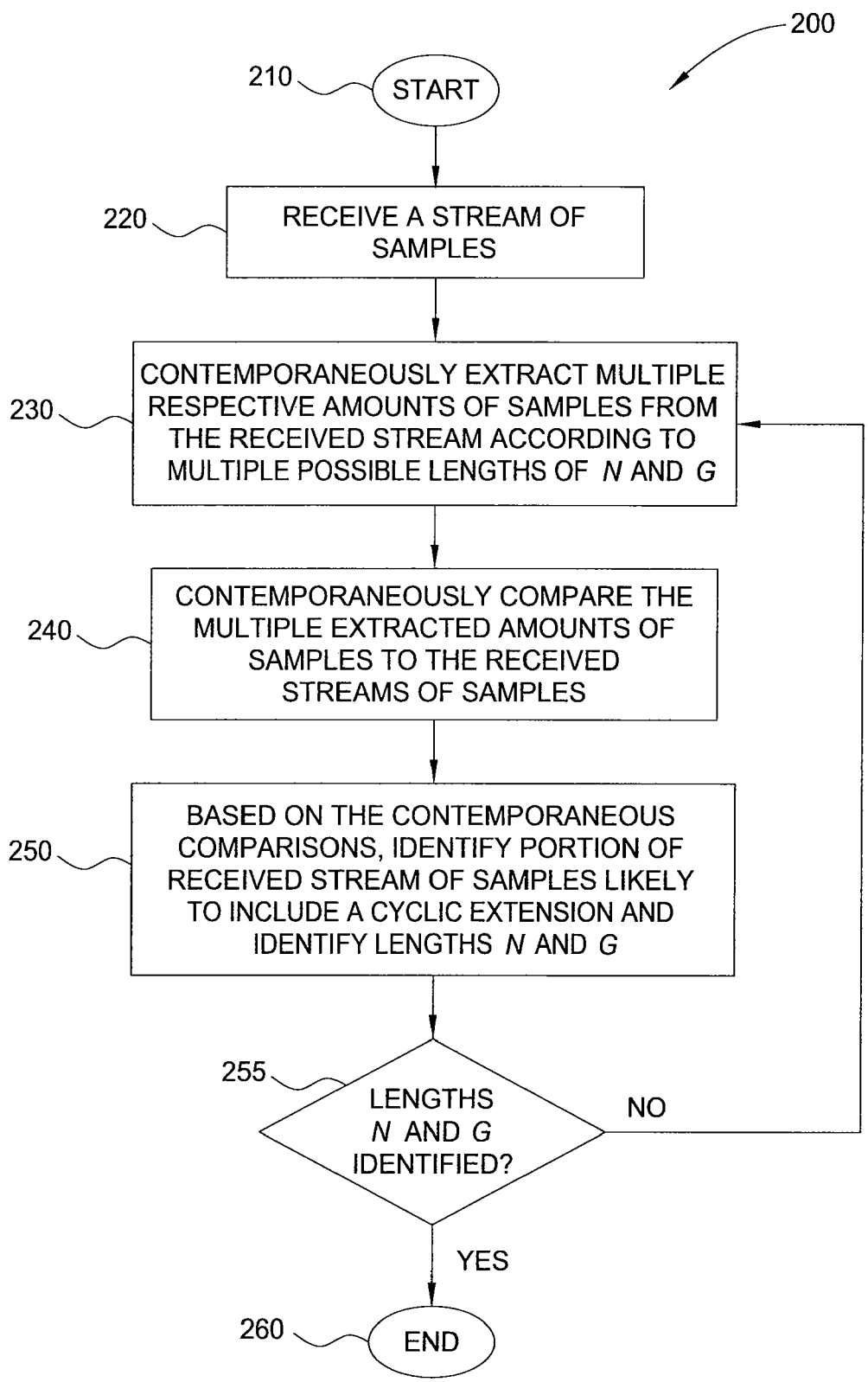
FIG. 2 depicts a method for carrying out various embodiments.

As mentioned, equations/inequalities (1) through (10) describe an algorithm for achieving receiver synchronization for fixed values for N and G. FIG. 2 depicts a block diagram of an exemplary method 200, suitable for (but not limited to) implementation in a synchronization module such as synchronization module 130 of FIG. 1B, or any device performing a similar function. Method 200 represents an expansion of the processes described by equations/inequalities (1) through (10), enabling receiver synchronization in instances where N and G are not fixed. Method 200 shall also be useful in illustrating various embodiments to be discussed with respect to FIGS. 4-6.

Method 200 begins at block 210 and proceeds to block 220, wherein a stream of samples having unknown lengths of N and G is received. At block 230, multiple respective amounts of samples from the received stream are extracted according to multiple possible lengths of N and G. The multiple extracted amounts of samples according to the possible lengths of N and G are then contemporaneously compared to the received stream of samples at block 240 (e.g., utilizing equations/inequalities (1) through (7)). In various embodiments, "comparison" in block 250 includes iteratively stacking correlation coefficients between the extracted and received samples until N and G are identified, or other period of time as will be explained in more detail with respect to FIGS. 3E and 3F. At block 250, the results of the comparison performed at block 240 are examined (e.g., utilizing inequalities (7) through (10)) to determine if a portion received stream likely to include a cyclic extension has been identified. If cyclic extension position was correctly identified, the lengths of N and G will inherently be known by examining which of the multiple possible values of N and G extracted and compared at steps 230 and 240 led to the position being identified. Method 200 then proceeds to block 255, wherein if cyclic extension position (and the values of N and G) was/were able to be identified at block 250, receiver synchronization is achieved and the method ends at block 260. If cyclic extension position and subsequent values of N and G were not able to be identified (e.g., due to noise and/or other adverse channel conditions), method 200 reverts back to step 220. That is, method 200 iteratively repeats until the values of N and G are determined and receiver synchronization is achieved.

By contemporaneously extracting and comparing multiple sample amounts of possible lengths N and G to a received stream, method 200 eliminates the need for time consuming synchronization methods based on "guessing" the lengths of N and G and performing synchronization operations in series. Rather, method 200 (and hardware to be discussed with respect to FIGS. 4-6) provides the functionality of performing synchronization functions in parallel. But, it is also contemplated that the method and associated hardware utilized to perform the synchronization functions can be adapted to perform synchronization in a partially parallel or sequential fashion, without departing from the overall principles described herein.

In various embodiments, once the boundaries of a symbol are deemed to have been detected, it is contemplated that further operations can be performed by module 140. These modules can provide feedback to module 130. If correct synchronization is indeed obtained, it is likely to successfully perform an FFT, equalize and extract the payload. If, on the other hand, synchronization has not been obtained, it will become obvious when processing the signal in module 140 that payload extraction is not possible, and method 200 must be performed or repeated.

It is also contemplated that in various embodiments, after synchronization has been obtained, it will be sufficient to monitor the obtained cyclic extension position in the received stream, rather than performing the entire method 200. For such monitoring, a portion of the same hardware utilized to perform method 200 can be utilized, while the remainder thereof can be put into a "sleep" or standby mode and "wake-up" when synchronization is lost.

Figure 3A:
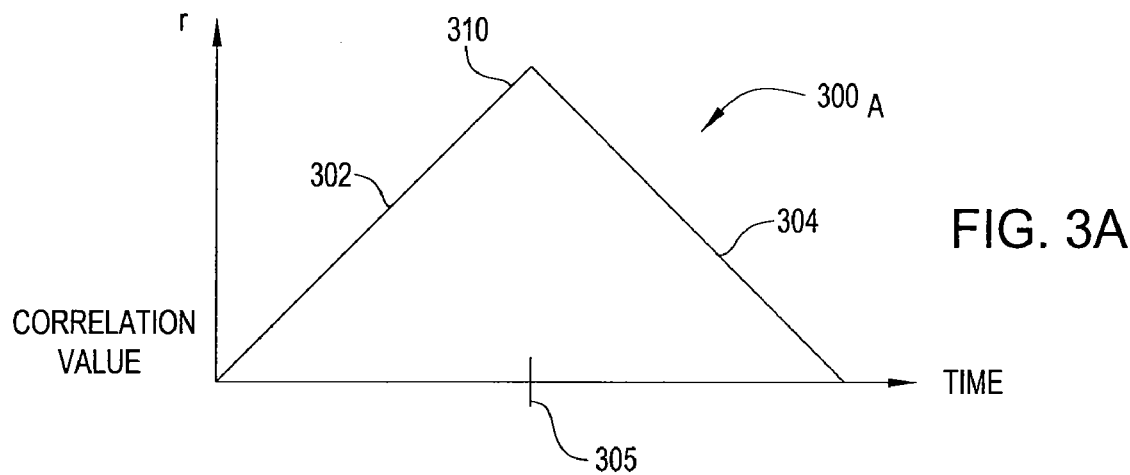
FIGS. 3A-3D depict correlation plots, useful for understanding various embodiments.
Figure 3B:
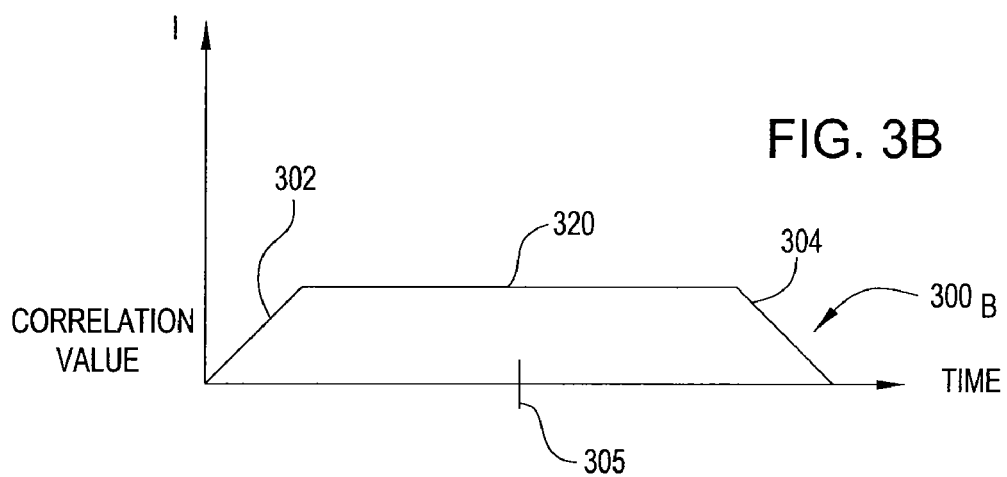
Figure 3C:
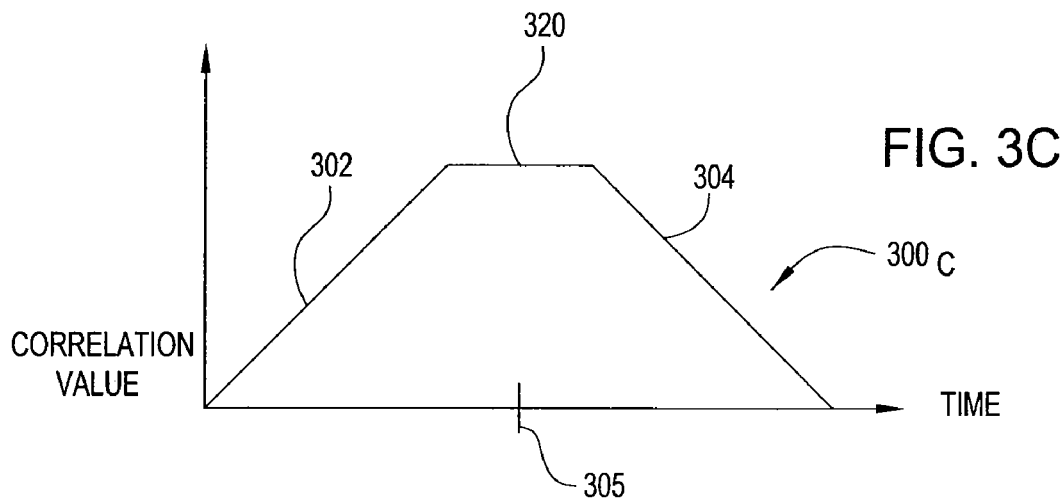

FIGS. 3A-3C depict graphical plots of the absolute value of the (stacked) sum of all correlation coefficients c, (for a given estimated cyclic extension size G) as a function of time t over the portion of a received stream of samples where the cyclic extension is likely located and correlation is at or near a maximum value. Depending upon the accuracy of a prospective cyclic extension length selection (e.g., per blocks 230 and 240 of FIG. 2), the correlation curve may include either a discernable peak 310 indicating exact correlation, or a plateau 320 portion that may be wide or narrow indicating non-exact correlation caused by factors such as multi-path or the wrong value of G being correlated with the received stream for a given N.

FIG. 3A depicts an instance of a cyclic extension size having been exactly estimated (e.g., per block 220 of FIG. 2). The said exact selection is characterized in FIG. 3A by a correlation curve $300_A$ exhibiting a ascending ramp function 302 rising to a peak followed by a descending ramp function 304 falling from the peak. The peak 310 of the ramp functions indicate maximum correlation and, therefore, a likely location 305 of a symbol start point.

In the case of a non-exactly selected cyclic extension size (and/or adverse channel conditions), correlation curves $300_B$ and $300_C$ such as those depicted in FIGS. 3B and 3C are produced. Specifically, the correlation curve $300_B$ or $300_C$ will exhibit an ascending ramp function 302, followed by a plateau 320, then a descending ramp function 304. The likely location 305 of the cyclic extension is the middle of the plateau. A plateau is related to the partial correlation achieved when an improperly selected cyclic extension size is used. The width of the plateau is related to the integer multiple difference between the selected cyclic extension size and the actual cyclic extension size. With respect to a summation of energy $E^{(r)}$ across a stacked correlation vector s, the width of a plateau may as mentioned be obtained by performing computations such as those explained with respect to equation (4), or other suitable means. A relatively wide or broad plateau such as that depicted in FIG. 3B indicates a selected cyclic extension size that is not close to the actual cyclic extension size, whereas a relatively narrow plateau such as that depicted in FIG. 3C indicates a selected cyclic extension size that is close to the actual cyclic extension size.

It is fully envisioned however, that a threshold metric for ascertaining whether cyclic extension size and position have been accurately determined (e.g., correlation values such as in FIG. 3A-FIG. 3C) is not necessarily an absolute parameter. In various embodiments, for example, it might not be possible to obtain an indication of "perfect" cyclic extension size/position selection, such as the correlation curve of FIG. 3A or other suitable indicator, due to adverse channel conditions (noise, fading, etc.) or signal envelope shaping measures (such as windowing) resulting in signal overlap, etc. As such, selection in many instances may properly be deemed to have occurred within an appropriately defined range of indication (e.g., correlation) values, instead of necessarily the "perfect" instance.

Figure 3D:
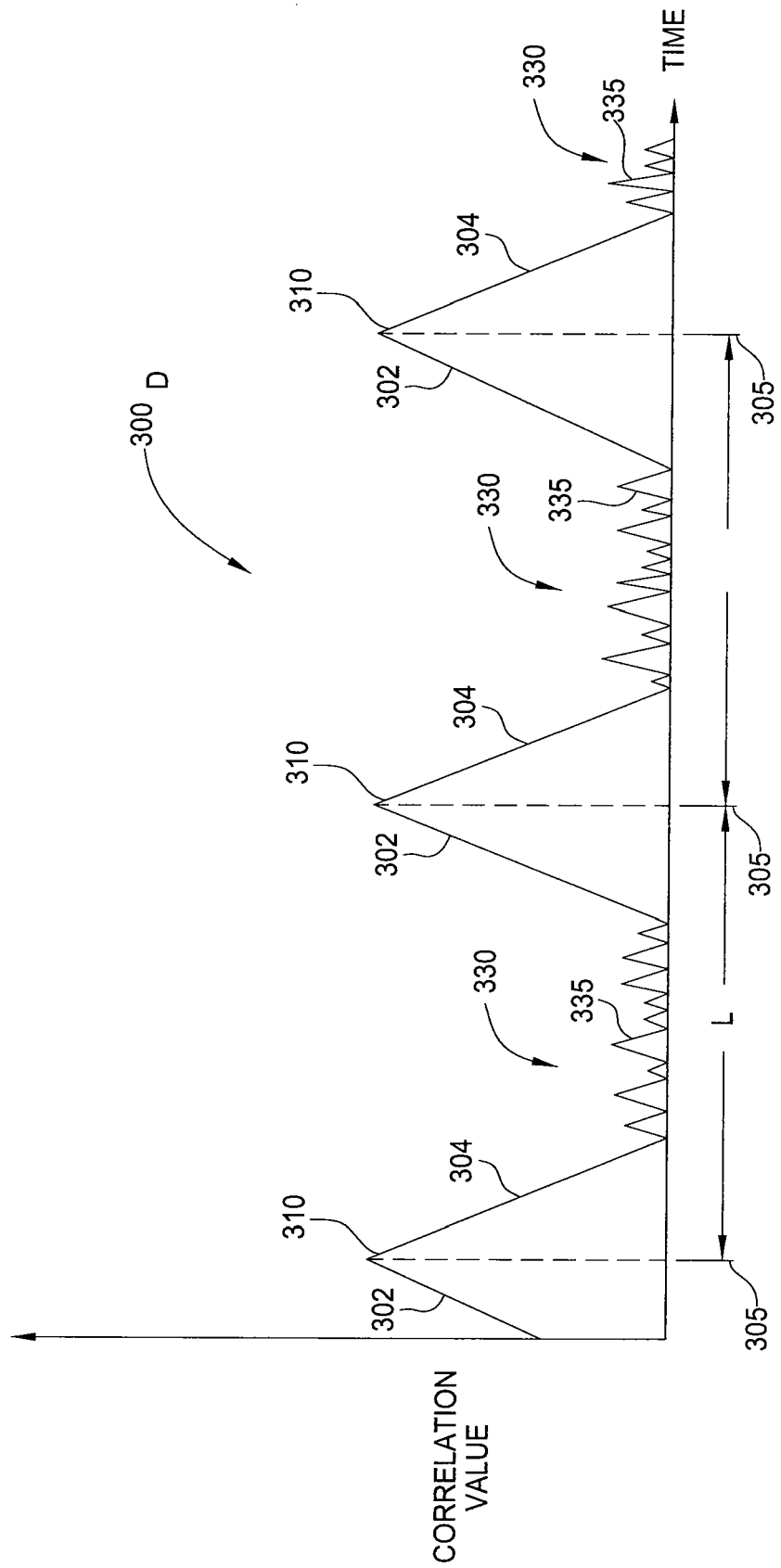

It should be noted that FIGS. 3A-3C are provided for illustrative purposes, and as mentioned only include stacked correlation values only about the center of a cyclic extension location, for a length G. With respect to equations (1) to (3), various embodiments when actually implemented will include performing correlation and stacking values over an entire symbol length L, including correlation and stacking over both sample length N and cyclic prefix length G. In actual implementations, a correlation curve obtained as described herein may include noise and/or other adverse channel conditions that are also not depicted FIGS. 3A-3C. FIG. 3D depicts an exemplary correlation curve $300_D$ according to various embodiments, taken over multiple symbol lengths L and including examples of adverse channel effects. Correlation curve $300_D$ depicts a series of periodic peaks 310 (as defined with respect to FIG. 3A) centered about likely locations 305 of a cyclic prefix in a stream of samples separated by a symbol length L. Between each peak 310 are regions 330 occurring over the non-cyclic extension (N) portion of symbol L, where correlation tends toward zero or is minimal compared to the peaks 310. This occurs because in various embodiments the payload (data content) of N and G are generally in random correlation with each other, thereby making stacking procedures thus far discussed (to be described further detail with respect to FIGS. 3E and 3F) tend to produce a small value. However, minimal peaks 335 that are not indicative of a cyclic extension location may still appear in regions 330 due to noise and interference in the channel, and/or coincidental correlation between N and G in portions of the symbol.

In various embodiments, if the symbol starting position was assumed to occur at a position where it does not, random data will be correlated at N positions apart. If, on the other hand, we are less than G positions away from the correct starting position, a triangle-like correlation begins to occur, which maximizes at the right position. In case of multi-path and noise, the shape of the correlation may be more blurred. As will be shown in FIG. 3F, if the channel conditions are adverse, correlation coefficient stacking is utilized in various embodiments to form a recognizable peak. In addition, one sees the effects of multipath. If we have the right value of N and the wrong (e.g., too small a value of) G, a longer plateau will be produced in the correlation pattern after the first iteration, as there is a longer overlap. However, since L=N+G, the next trapezoid will not be aligned with the first.

Figure 3E:
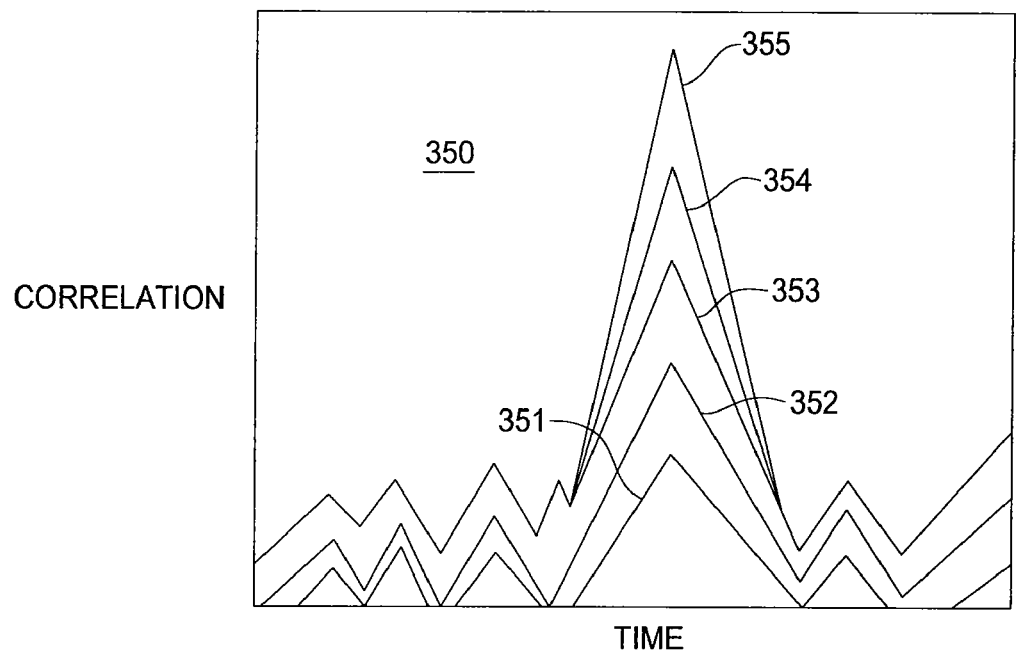
FIGS. 3E-3F depict an example iterative correlation stacking according to various embodiments.
Figure 3F:
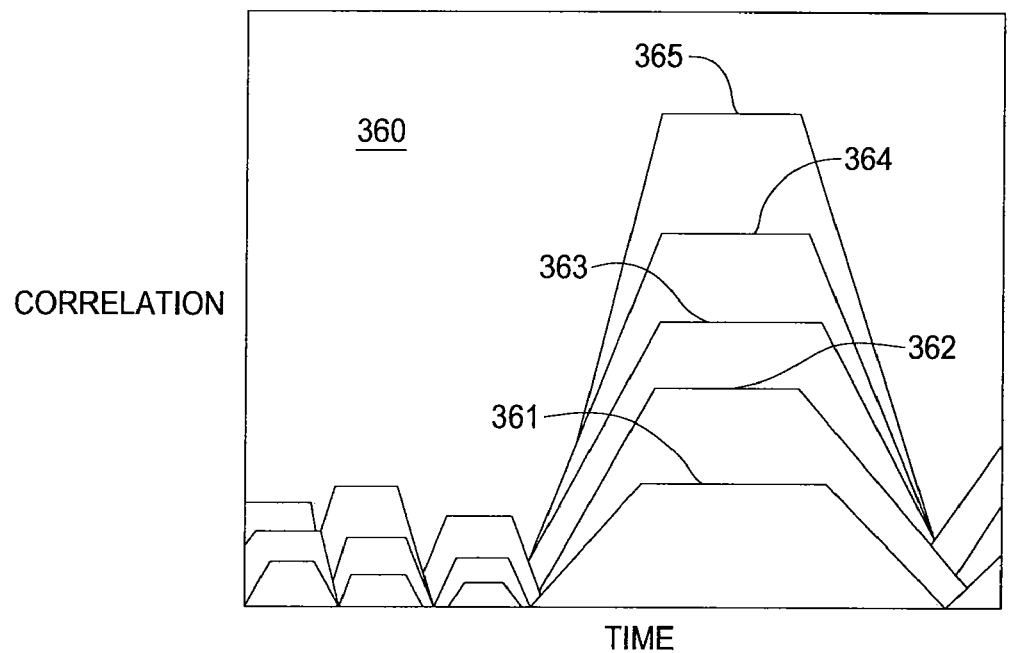

FIGS. 3E and 3F depict examples of iterative correlation stacking discussed with greater detail than with respect to FIG. 3D. FIG. 3E includes stacking iteration profile 350 and FIG. 3F includes stacking iteration profile 360. In several embodiments, stacking iteration profiles 350 and 360 represent examples of the "comparison" process discussed with respect to blocks 240 and 250 in method 200 of FIG. 2. Stacking iteration profile 350 includes stacking iterations 1 through 5 (351 through 355 respectively) performed in a substantially distorted channel. That is, the noise level of the channel is quite significant, but there is no multi-path in this situation. Stacking iteration profile 350 shows a correlation peak represented in initial stacking iteration 351, with sharpening peaks over each successive iteration 352-355—e.g., per eq. (3).

As an example, for each stacking iteration 351-355, correlation is performed over approximately L samples between the extracted and received amount of samples per block 240 of method 200. If after a given correlation iteration, a sufficiently strong peak 310 (e.g., sufficient to satisfy equation (10)) is not located, correlation is repeated and those subsequent correlation values (cumulatively) stacked on top of each preceding value, to amplify any correlation that might exist but was not sufficiently pronounced due to adverse channel conditions or other reasons.

If correlation was present but suppressed due to a poor channel, the peak 310 will grow after stacking of the subsequent iteration—e.g., peak 352 compared to 351. In various embodiments, if a peak 310 does not grow after a particular number of stacking iterations, it can be deduced that a likely location 305 of cyclic extension a cyclic extension was not able to be located. In this situation, the stacking operation may be reset and/or other possible values of N and G may be considered if all were not being contemporaneously evaluated already.

Stacking iteration profile 360 is similar to profile 350, but demonstrates iterative stacking occurring in the presence of channel multi-path, which is a realistic channel condition. As with stacking iteration profile 350, stacking iteration profile 360 include stacking iterations 1 through 5 (361 through 365 respectively). However, compared to iterations 351-355, the correlation peaks of iterations 361-365 have been widened due to multi-path. Yet, iterative stacking improves the peak definition with each iteration, providing a clear indication of correlation even in the presence of such conditions. Stacking iteration profile 360 is an example of where procedures such as those discussed with respect to equations (9) and (10) may be utilized to ascertain if proper cyclic extension selection has occurred.

Figure 4:
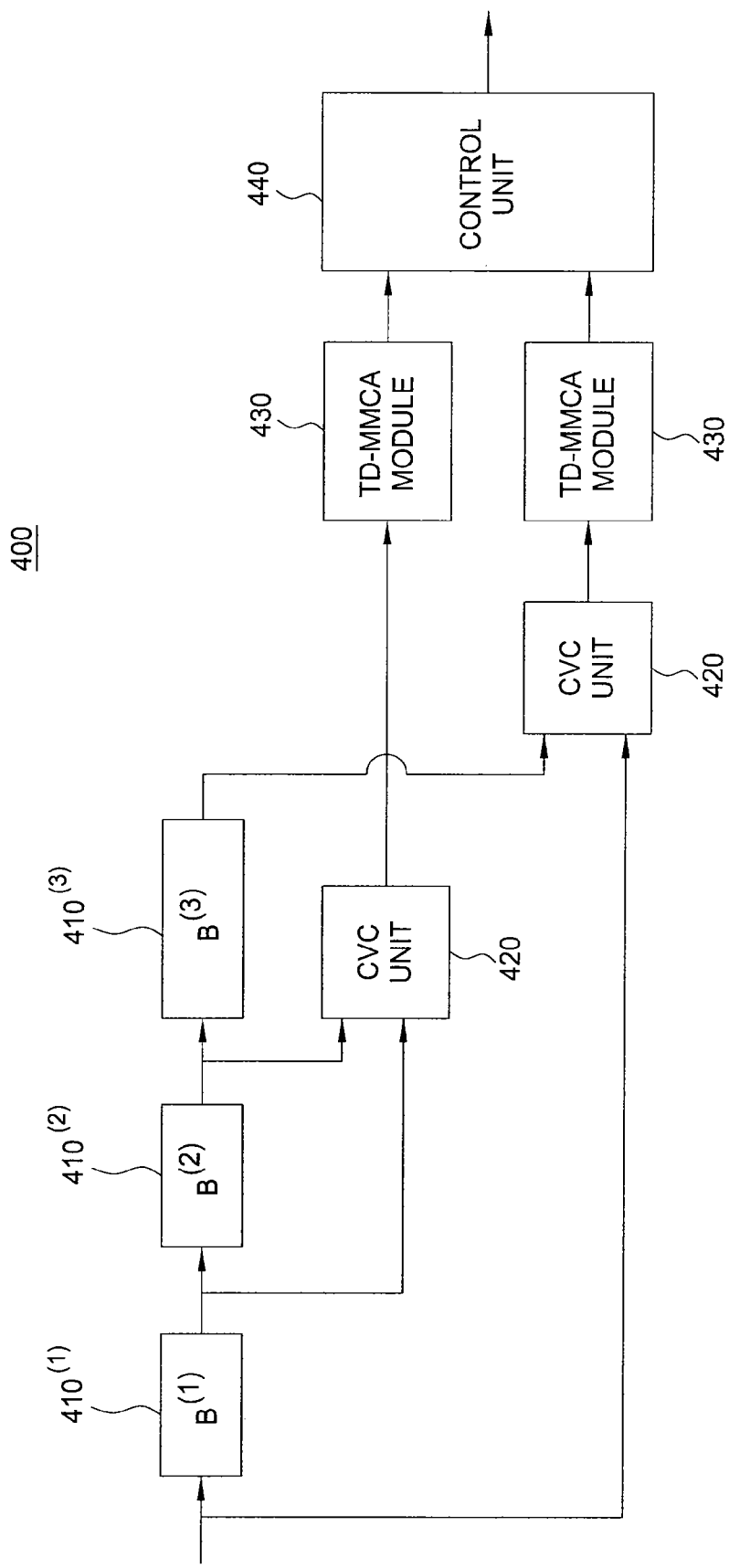
FIG. 4 depicts a block diagram of a symbol synchronization module 400, suitable for implementation in a receiver wherein symbols of varying lengths are detected.

FIG. 4 depicts a block diagram of an exemplary synchronization module 400, suitable for implementation as a synchronization module such as synchronization module 130 of FIG. 1B, in a receiver wherein symbols of varying lengths L=N+G are detected. As previously discussed, N denotes the length of the information-carrying part of a symbol that may at any time assume any one of a set of permissible values $\mathcal{N}$ and G denotes the length of the cyclic extension. An OFDM signal $y_t$ enters synchronization module 400, which includes buffer storage elements 410$^{(1-3)}$ of varying lengths $B^{(1)}$, $B^{(2)}$ and $B^{(3)}$ to accommodate a plurality of different values $N \in \mathcal{N}$. The multiple serial buffer storage element 410$^{(1)-(3)}$ are configured to allow the signal $y_t$ to be available at different respective delays. The signal $y_t$ may be a real or complex signal, which may in some embodiments be stored in a lower resolution than would be utilized for a FFT. A correlation value computation (CVC) unit 420 correlates sampled signal values $y_t$ and $y_{t-N}$ for each value of $N \in \mathcal{N}$.

As an example, synchronization module 400 depicts an embodiment wherein it is assumed that N has two permissible values (e.g., $\{N_1, N_2\}$) where $N_1 < N_2$. However, various embodiments as a whole should in no way by virtue of the present example be construed as limiting N to have only two permissible values. To the contrary, various embodiments are fully contemplated that permit N (as well as G) to assume any value. To provide a correct delay for the CVC unit 420, synchronization module 400 includes (as an example) $B^{(2)}$ having a length $N_1$ and $N_2 = B^{(1)} + B^{(2)} + B^{(3)}$. Those skilled in the art and informed by the teachings herein will readily appreciate that alternate buffer lengths $B^{(1)}, B^{(2)}, B^{(3)} \ldots B^{(i)}$ may be implemented and combined to facilitate processing of symbols having of any length L=N+G. In various embodiments, the overall sum of buffer lengths $(B^{(1)} + B^{(2)} + B^{(3)} + B^{(i)})$ may generally (but not necessarily) be chosen so as to be the largest possible value of $\mathcal{N}$ as in FIG. 4.

The output of each CVC unit 420 is processed by a time-delayed multiple moving correlation averaging (TD-MMCA) module 430. In one embodiment, TD-MMCA module 430 is specifically designed to process a given value of N and $\mathcal{G}^{(N)}$, wherein as has been mentioned with respect to equations/inequalities (1) through (10), G is related to $\mathcal{G}^{(N)}$ such that $G \in \mathcal{G}^{(N)}$. The respective outputs of TD-MMCA modules 430 are processed by control unit 440, which provides an output signal indicating synchronization has been achieved, the cyclic extension can be removed and information-carrying portion of the symbol processed (e.g., via modules 134 and 140 or other suitable devices). The detected length N of the information carrying part of the symbol is conveyed to subsequent modules.

Figure 5:
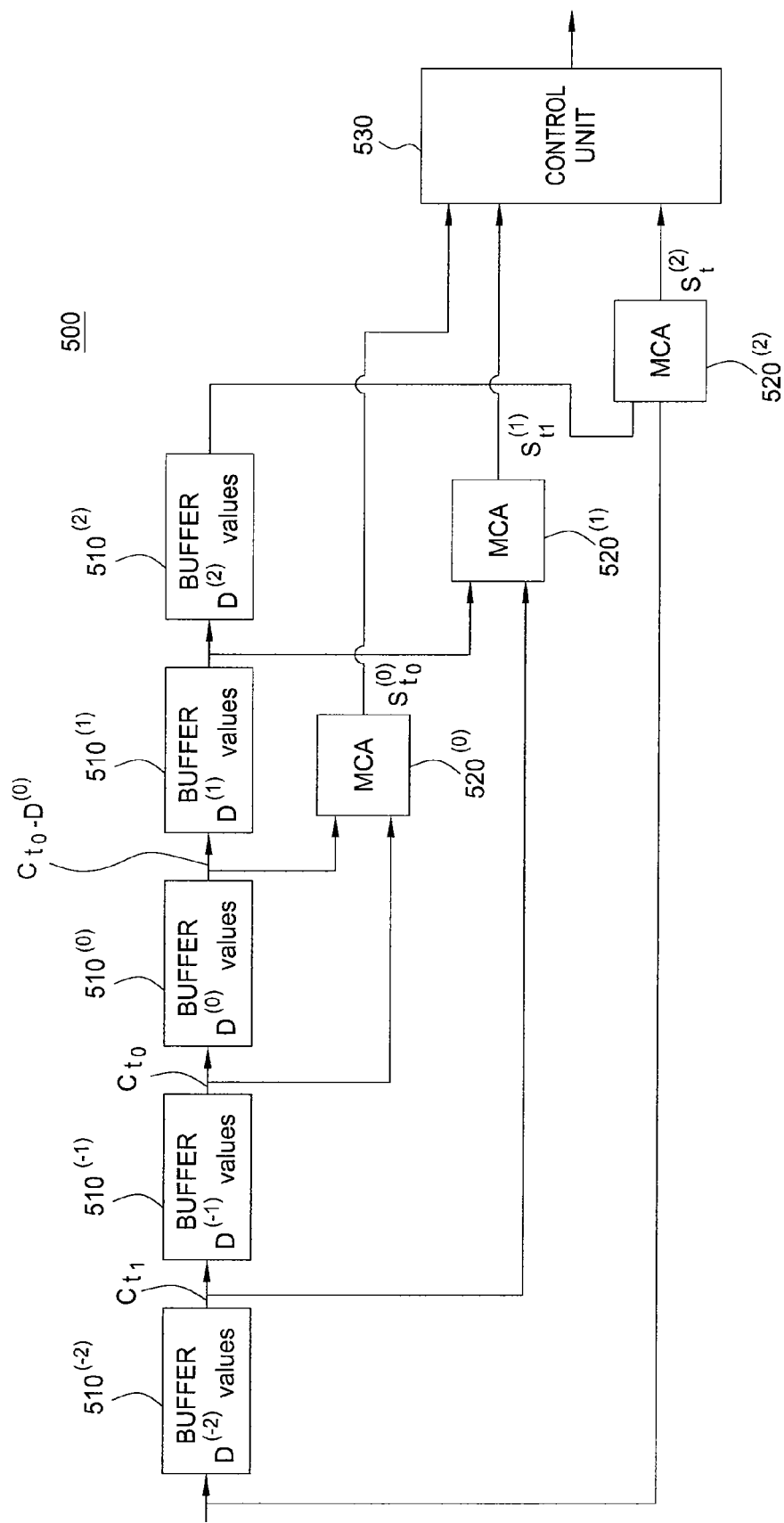
FIG. 5 depicts a general block diagram of a time-delayed multiple moving correlation averaging (TD-MMCA) module.

FIG. 5 depicts a block diagram of one exemplary embodiment of a TD-MMCA module 500, suitable for implementation as a TD-MMCA module 430 of FIG. 4. The TD-MMCA module receives correlation values from CVC units 420 for all correlated signals $y_t$ and $y_{t-N}$ for each value of $N \in \mathcal{N}$ and identifies a peak correlation. A sample-by-sample correlation coefficient $q_t$ processed by TD-MMCA module 500 is now defined in more general terms (than equation (1)) to be $$q_t = f_q(y_t, y_{t-N}), \tag{11}$$

wherein $f_q$ denotes the sample-by-sample correlation function. It should be noted that a cyclic extension length value G is no longer included as an initial argument of the time shifted function $t_{t-N}$, since a symbol is being detected wherein G is unknown. Similar to equation (2), the elements $q_t$ may generally be expressed as $$f_q(y_t, y_{i-N}) = y_t y_{t-N}^*. \tag{12}$$

However, $f_q$ may also be expressed as $$f_q(y_t, y_{t-N}) = |y_t - y_{i-N}|^2. \tag{13}$$

wherein equation (13) returns a minimum correlation rather than a maximum.

It is fully contemplated that other and further correlation parameters may also be utilized beyond those thus far mentioned. The correlation function may for example comprise more than two arguments and the resolution of the result reduced in embodiments where appropriate. Depending upon a specific application, various embodiments may also be able to tolerate a reduction in numerical precision (e.g., by reducing buffer size) if the reduction does not lead to a significant loss in system performance. It will thus be appreciated that any suitable means of comparing an extracted amount of samples with an incoming signal may be performed without departing from the general scope.

TD-MMCA module 500 includes a plurality of buffers 510$^{(-2)} \ldots$ 510$^{(2)}$ of varying respective delays $D^{(-2)} \ldots D^{(2)}$ to collectively process all possible delays of the correlated signal $y_{t-N}$. In general (but not necessarily in all cases), the element $y_{t-N}$ may be discarded as soon as $q_t$ has been determined. As such, buffers 510 are configured in various embodiments to provide storage for at least N elements. It may also in some embodiments be sufficient to utilize lookup tables to perform a coarse mapping for a given $y_t$ and $y_{t-N}$, in certain cases circumventing the need of multipliers.

In various embodiments, correlation coefficients q, obtained per equations (11)-(13) are combined at time t for a single symbol with a cyclic extension of length G according to a sequence $$s_t = \sum_{g=0}^{G-1} q_{t-g}, \quad (14)$$

having a value that may be expressed as $$s_t = s_{t-1} + (q_t - q_{t-G}), \quad (15)$$

where $q_t = 0$ for $t<0$. The stacking process represented by equations (14) and (15) is performed by respective Moving Correlation Averaging (MCA) modules $520^{(0)} \ldots 520^{(2)}$. It follows from equations (14) and (15) that a buffer length of G is required to hold the values $c_{t-G} \ldots c_{t-1}$, which in one embodiment may be implemented as a cyclic buffer (RAM having with a counter modulo the size of a buffer) or suitable alternative. Correspondingly, the MCA modules $520^{(0)-(2)}$ are configured to stack coefficients $q_t$ for all possible delay values. In the embodiment with respect to TD-MMCA module 500 embodiment, as an example, MCA module $520^{(0)}$ stacks correlation values including a delay value $D^{(0)}$, MCA module $520^{(1)}$ stacks correlation values including a delay value $D^{(-1)}+D^{(0)}+D^{(1)}$, and MCA module $520^{(1)}$ stacks correlation values including a delay value $D^{(-2)}+D^{(-1)}+D^{(0)}+D^{(1)}+D^{(2)}$. A control unit 530 interfaces with the MCA modules 520 and identifies the maximum correlation value $s_t$ for each delay.

By storing G coefficients $c_t$, it is only necessary to store N input values $y_{t-N} \ldots y_{t-1}$, as opposed to embodiments discussed with respect to equations/inequalities (1) through (10), which would require that N+G input values be stored. The correlation output $c_t$ is quantized/rounded and stored in a buffer $510^{(-2)}$ that holds $D^{(-2)}$ values. The output of the buffer is processed by both a MCA module 520 and a next buffer $510^{(-1)}$ which holds values $D^{(-1)}$, etc. In various embodiments, buffer size is typically chosen such that $D^{(0)} = G_1$ and $$D^{(-i)} + D^{(i)} = G_i - G_{i-1}, \quad (16)$$

wherein $\mathcal{G}^{(N)}\{G_1, G_2, \ldots\}$ is an ordered set and $G_1$ is the smallest possible cyclic extension value.

Figure 6A:
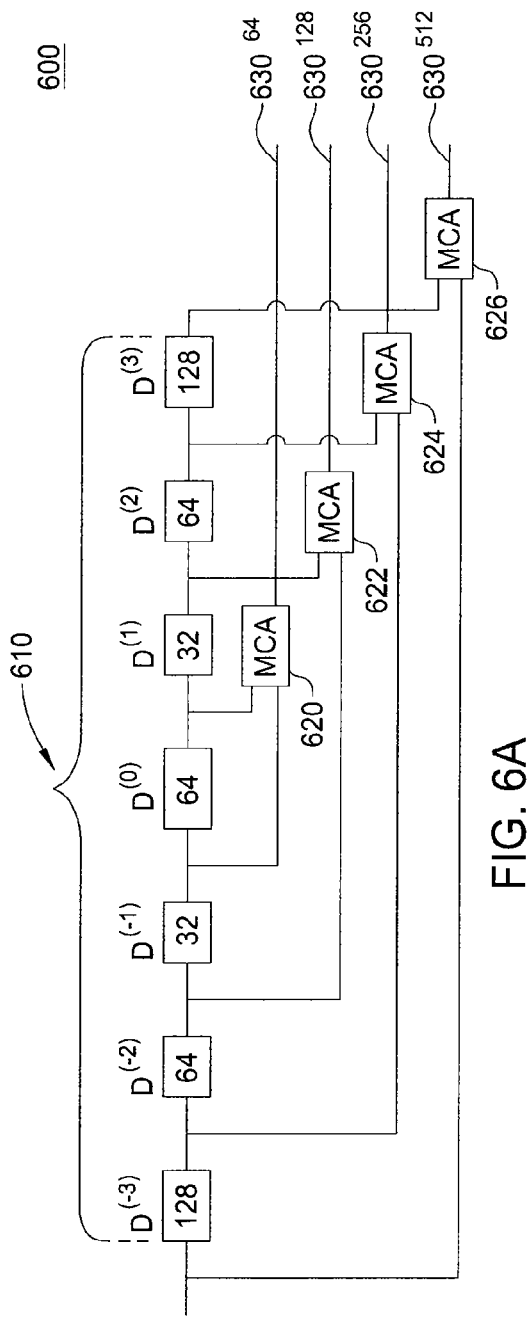
FIG. 6A depicts a block diagram of a TD-MMCA module per one embodiment.

FIG. 6A depicts an exemplary embodiment of a TD-MMCA module 600 suitable for implementation in an OFDM receiver, where N=2048 and $\mathcal{G}^{(N)}\{64, 128, 256, 512\}$. To allow for all possible delays ($D^{(i)}$) within $\mathcal{G}^{(N)}$, TD-MMCA module 600 includes as an example buffers 610 having delay values $D^{(0)} = 64$, $D^{(i)} = D^{(-1)} = 32$, $D^{(2)} = D^{(-2)} = 64$, and $D^{(3)} = D^{(-3)} = 128$. A maximum overall delay that can be achieved is thereby 512. That is $D^{(-3)} + D^{(-2)} + D^{(-1)} + D^{(0)} + D^{(1)} + D^{(2)} + D^{(3)} = 128 + 64 + 32 + 64 + 32 + 64 + 128 = 512$. Shorter delays for the remaining values of $\mathcal{G}^{(N)}$ may respectively include $D^{(-2)} + D^{(-1)} + D^{(0)} + D^{(1)} + D^{(2)} = 256$, $D^{(-1)} + D^{(0)} + D^{(1)} = 128$ and $D^{(0)} = 64$.

Figure 6B:
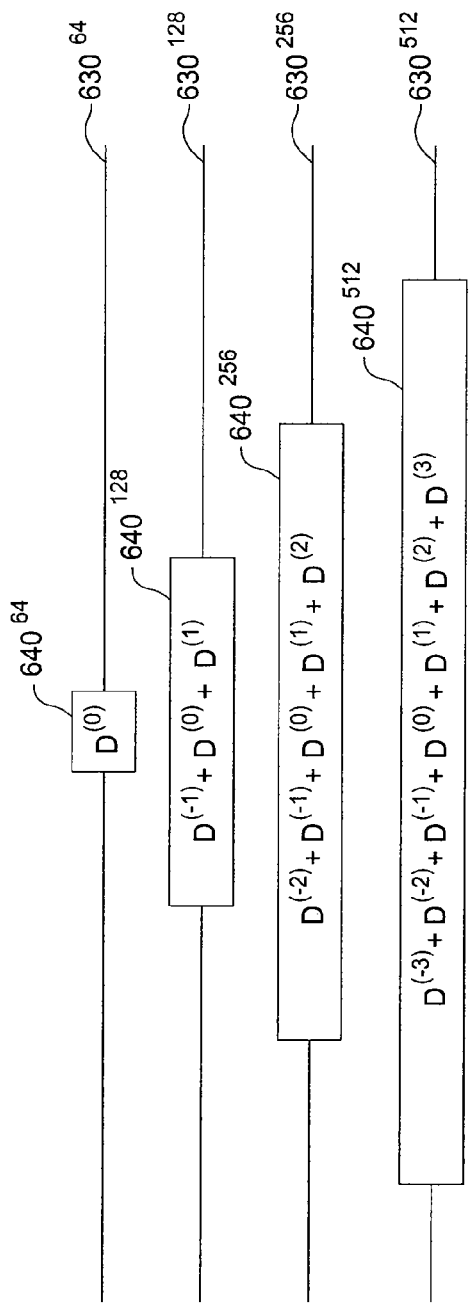
FIG. 6B depicts averaging windows for various delay values with respect the TD-MMCA module of FIG. 6A.

FIG. 6B depicts delays for each value of $\mathcal{G}^{(N)}$ as an averaging window 640, for each respective delay within $$\sum_{i=-3}^{3} D^{(i)}$$

mentioned above as an example, and/or $\Sigma D^{(i)}$ (in embodiments including additional delays). In one embodiment with respect to FIG. 6B, averaging window $640_{64}$ has a length of 64 corresponding to $D^{(0)}$, averaging window $640_{128}$ has a length of 128 corresponding to $D^{(-1)}+D^{(0)}+D^{(1)}$, etc. The selection of sizes for averaging windows 640 in FIG. 6B are made such that the MCA units (620, 622, 624, 626) contain the correlation average for time t−256, but it is contemplated that any other suitable time may be utilized.

The minimum value observed in the respective MCA units (620, 622, 624, 626) give an indication of a correlation value when it is very unlikely that the correlation window contains the cyclic extension. In this respect, the observing of a minimum value performs a similar function to the calculation of $E^{(r)}$ in equation (4). In one embodiment, the output of one or more of the MCA units are used by a control unit such as 530 of FIG. 5 to determine a peak to average $E^{(r)}$ ratio and an appropriate threshold (e.g., $T^{(N,G)}$) thereof. In one embodiment, the MCA unit corresponding to the largest possible value of G (e.g., MCA 626) provides this signal.

In embodiments with respect to FIG. 5, if the smallest value in $\mathcal{G}^{(N)}$ is the true cyclic prefix length for given N, the MCA $520^{(0)}$ is likely to produce, in the absence of multipath, a correlation profile similar to FIG. 3A, and the other MCAs have a noisier version of this shape. However, because of the choice of the buffers, illustrated in FIG. 6B, the peak is likely to be detected at the same position (under favorable channel conditions). The minimum correlation value of the largest MCA is unlikely to contain a part of the cyclic prefix, and therefore provides a useful baseline value similar to $E^{(r)}$, in order to interpret the height of a stacked peak relative to a previously determined peak or minimum correlation value, and determine whether or not to declare synchronization. If the largest value in $\mathcal{G}^{(N)}$ is the true cyclic prefix length, MCA $520^{(2)}$ is likely to show a large peak such as peak 310 of FIG. 3A, compared to $520^{(1)}$ and $520^{(0)}$ are likely to show plateaus such as plateaus 320 in FIG. 3C and FIG. 3B respectively. Again, for the choice of the buffers as in FIG. 6B the peaks and/or middle of the plateau are likely to be aligned.

The control unit (e.g., control unit 530) measures the time between correlation peaks and the energy and width of the peaks to determine the values of N and G. Stacking may be performed with whatever degree of precision is required to suit an embodiment being implemented. In one embodiment, for example, stacking does not necessarily include all calculated correlation coefficient values. Instead, indices are stored where the correlation coefficient values exceed certain thresholds. This is particularly useful for low signal-to-noise (SNR) conditions or situations where there is severe multipath.

The described embodiments may be implemented within the context of methods, computer readable media and computer program processes. As such, it is contemplated that some of the steps discussed herein as methods, algorithms and/or software processes may be implemented within hardware (e.g., circuitry that cooperates with a processor to perform various steps), software or a combination of hardware and software.

The invention may be implemented as a computer program product wherein computer instructions, when processed by a computer, adapt the operation of the computer such that the methods and/or techniques described herein with respect to various embodiments are invoked or otherwise provided. Instructions for invoking the described methods may be stored in fixed or removable media, transmitted via a stream in a signal bearing medium such as a broadcast medium, and/or stored within a working memory or mass storage device associated with a computing device operating according to the instructions.

Generally speaking, a computing device including a processor, memory and input/output means may be used to process software instructions, store software instructions and/or propagate software instructions to or from a communications channel, storage channel or other computer/system.

While the foregoing is directed to various embodiments, other and further embodiments of the invention may be devised without departing from the basic scope thereof. As such, the appropriate scope of the invention is to be determined according to the claims, which follow.

What is claimed is:

1. A method for synchronizing a receiver, comprising:
contemporaneously extracting multiple amounts of samples from a received stream of samples containing at least one symbol, according to possible lengths of an information-carrying portion and a cyclic-extension portion of the at least one symbol;
contemporaneously comparing the multiple extracted portions to the received stream of samples using stacked average correlation values between the received stream and the extracted amount of samples to determine at least one portion of the stream likely to include a symbol start point.

2. The method of claim 1, further comprising identifying the length of the information-carrying portion and the cyclic-extension portion for the at least one symbol based on the contemporaneous comparison.

3. The method of claim 2, wherein identifying the length of the information-carrying portion and the cyclic-extension portion includes identifying at least one portion of the received stream likely to include a symbol start point.

4. The method of claim 3, wherein identifying at least one portion of the stream likely to include a symbol start point comprises determining an average correlation between the received stream and the extracted amounts of samples.

5. The method of claim 1, wherein the symbol start point is deemed to have been accurately determined if the average correlation between the received stream and the extracted amounts of samples exceeds a predefined threshold.

6. The method of claim 5, wherein the predefined threshold is a peak average energy of the stacked average correlation values.

7. The method of claim 6, wherein stacking average correlation coefficients continues until the predefined threshold is met.

8. The method of claim 6, wherein the predefined threshold is a peak average energy of a stacked correlation value relative to a previous average correlation value.

9. The method of claim 8, wherein the previous average correlation value is a minimum average correlation value.

10. The method of claim 6, wherein if the predefined threshold is not obtained within a predefined period of time, said identifying the length of the information-carrying portion and the cyclic extension portion for the at least one symbol is repeated.

11. A synchronization module, comprising:
means for contemporaneously extracting multiple amounts of samples from a received stream of samples containing at least one symbol, according to possible lengths of an information-portion and a cyclic-extension portion of the at least one symbol; and
means for contemporaneously comparing the multiple extracted portions to the received stream of samples using stacked average correlation values between the received stream and the extracted amount of samples to determine at least one portion of the stream likely to include a symbol start point.

12. The synchronization module of claim 11, further comprising means for identifying the length of the information-carrying portion and the cyclic-extension portion for the at least one symbol based on the contemporaneous comparison.

13. The synchronization module of claim 12, wherein identifying the length of the information-carrying portion and the cyclic-extension portion includes identifying at least one portion of the received stream likely to include a symbol start point.

14. The synchronization module of claim 13, wherein identifying at least one portion of the stream likely to include a symbol start point comprises determining an average correlation between the received stream and the extracted amounts of samples.

15. The synchronization module of claim 14, wherein identifying at least one portion of the stream likely to include a symbol start point further comprises stacking average correlation values between the received stream and the extracted amounts of samples.

16. The synchronization module of claim 15, wherein the symbol start point is deemed to have been accurately determined if the average correlation between the received stream and the extracted amounts of samples exceeds a predefined threshold.

17. The synchronization module of claim 16, wherein the predefined threshold is a peak average energy of the stacked average correlation values.

18. The synchronization module of claim 17, wherein the predefined threshold is a peak average energy of a stacked correlation value relative to a previous correlation value.

19. The synchronization module of claim 18, wherein previous correlation value is a minimum correlation value.

20. The synchronization module of claim 17, wherein if the predefined threshold is not obtained within a predefined period of time, said identifying the length of the information-carrying portion and the cyclic extension portion for the at least one symbol is repeated.

21. The synchronization module of claim 11, wherein the means of contemporaneously extracting multiple amounts of samples comprises processing the received stream of samples with a plurality of buffers arranged in combination to contemporaneously provide delays of the received stream of samples according to each of the possible lengths of the information-portion and the cyclic-extension portion of the at least one symbol.

22. The synchronization module of claim 14, wherein the means for contemporaneously comparing the multiple extracted portions to the received stream of samples comprises a plurality of correlation value computation units connectively coupled to the plurality of buffers, such that each respective correlation value computation unit respectively determines the average correlation for each of the possible lengths of the information-portion and the cyclic-extension portion of the at least one symbol.

23. The synchronization module of claim 22, wherein each correlation value computation unit is connectively coupled to a respective time-delayed multiple moving correlation averaging module, comprising:
- a plurality of buffers arranged in combination to contemporaneously provide delays of the average correlation values determined by the correlation value computation units according to each of the possible lengths of the information-portion and the cyclic-extension portion of the at least one symbol;
- a plurality of moving correlation average modules for stacking the average correlation values at each possible delay according to each of the possible lengths of the information-portion and the cyclic-extension portion of the at least one symbol; and
- a control unit connectively coupled to the plurality of moving correlation average modules for determining if the position likely to include a cyclic extension start point has been identified.

24. A non-transitory computer readable medium containing a program which, when executed by a processor, performs a method for synchronizing a receiver, comprising:
- contemporaneously extracting multiple amounts of samples from a received stream of samples containing at least one symbol, according to possible lengths of an information-portion and a cyclic-extension portion of the at least one symbol;
- contemporaneously comparing the multiple extracted portions to the received stream of samples using stacked average correlation values between the received stream and the extracted amount of samples to determine at least one portion of the stream likely to include a symbol start point; and
- identifying the length of the information-carrying portion and the cyclic-extension portion for the at least one symbol based on the contemporaneous comparison.

* * * * *